Patented Sept. 28, 1943

2,330,340

UNITED STATES PATENT OFFICE 2,330,340

INSECTICIDE

Curtis E. Dieter, George E. Lynn, and Bernard J. Thiegs, Midland, Mich., assignors to The Dow Chemical Company, Midland, Mich., a corporation of Michigan No Drawing. Application May 16, 1942, Serial No. 443,284

5 Claims. (Cl. 167—30)

This invention relates to insecticides and is particularly concerned with compositions comprising di-(4-chloro-phenoxy)-methane and a phenothioxin compound.

Extracts of insecticidal plant products have been widely used for the control of insect pests. Because of the difficulties attending the provision of adequate supplies of such plant products, efforts are being made to employ phenothioxin and other synthetic organic toxicants as substitutes therefor. Phenothioxin and its derivatives are relatively non-injurious to vegetation but do not have sufficient toxicity against many common insect pests to warrant their recommendation as satisfactory for use in general control procedures.

Specific problems which are not met in satisfactory fashion by the use of phenothioxin compounds alone, and for which adequate supplies of such plant extract materials as rotenone are not available, are the control of Mexican bean beetle and red spider. Vegetation infested by either or both of these organisms requires immediate and effective treatment if substantial injury is to be avoided. The problem is further complicated by the tender nature of the vegetative growth affected, whereby many toxicant materials ordinarily suitable for general control cannot be used without materially injuring the plant.

Among the objects of the present invention is to provide toxicant mixtures comprising phenothioxin and phenothioxin compounds which mixtures will be more quickly and more permanently toxic to common agricultural and household pests than many compositions at present employed. A further object is to provide a toxicant product comprising a mixture of cheap and readily synthesizable compounds which will not be characterized by those properties of irritation and toxicity to humans with which many other synthetic toxicants are identified. A still further object is to supply a mixture of mutually activating toxicants displaying a synergistic action as regards insect and mite toxicity. Other objects of the invention will become apparent from the following description and examples.

According to the present invention di-(4-chloro-phenoxy)-methane is mixed with one or a plurality of phenothioxin compounds to obtain toxicant mixtures. When compounded in standard type parasiticidal compositions, these toxicant mixtures exert a toxicity against insects and mites which is greater than additive with respect to that shown by the constituent parts of the mixture in equivalent amounts. The expression "phenothioxin compound" as herein employed refers to phenothioxin, phenothioxin oxide and dioxide, and to nuclear-substituted derivatives of any of these wherein the substituents are of such a nature as to permit the use of the compound in combination with di-(4-chloro-phenoxy)-methane and the usual diluents and carriers without injury to plant growth. A preferred group of toxicants falling within the scope of the expression "phenothioxin compounds" are those having the formula:

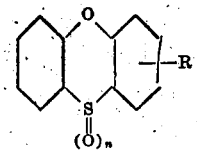

wherein R is selected from the group consisting of hydrogen, aryl of the benzene series, cycloalkyl, alkyl containing at least 6 carbon atoms, and halogen, and $n$ represents 0, 1, or 2. Mixtures of the foregoing compounds with di-(4-chloro-phenoxy)-methane have been found to exert a synergistic effect as regards control of common agricultural and household pests and particularly red spider and Mexican bean beetle.

In carrying out the invention, the di-(4-chloro-phenoxy)-methane and phenothioxin compound may be mixed together in any suitable manner, e. g. by grinding, simple mixing, dissolving one in the other, etc. The exact proportions of materials employed vary with the particular phenothioxin compound concerned, the parasite to be controlled, tolerance of the host plant for the toxicant mixture, the form in which the toxicant is to be applied and the conditions under which such application is to be made. In general from about 1 to 100 parts by weight of phenothioxin compound may be employed with each 10 parts of di-(4-chloro-phenoxy)-methane. Any suitable concentration of the resulting mixture may be applied for pest control, with from about 0.001 to 3 per cent by weight in spray compositions, and from about 1 to 5 per cent in dust mixtures having been found satisfactory in most instances.

The toxicant mixtures may be compounded with various inert carriers such as diatomaceous earth, bentonite, talc, sulfur, wood flours, inorganic phosphates, gypsum, or lime to form agricultural dusts adapted to be applied in standard dusting equipment. If desired, such dusts may be employed as concentrates and subsequently dispersed in water or other liquid carriers to form sprays. The toxicant mixtures may also be incorporated with various wetting, dispersing, and sticking agents to form compositions adapted to be further diluted to produce dusts or spray materials. In the preparation of such concentrates, as distinguished from finished dusts and sprays from about 5 to 95 per cent by weight of the toxicant mixture is commonly employed.

In other embodiments of the invention, the mixture of toxicants may be dispersed in oil-water emulsions or employed in water suspension with or without the addition of emulsifying, wetting, or dispersing agents. Similarly, the mixture may be used in combination with such materials as inorganic pigments, organic dyes, acid lead arsenate, lime sulfur, pyrethrum, rotenone, organic thiocyanates, sulfur, copper sprays, and the like.

The several examples are illustrative with respect to the particular compounds, compound mixtures, and concentrations employed, but are not to be construed as limiting the invention.

EXAMPLE 1

10 parts by weight of di-(4-chloro-phenoxy)-methane, 10 parts of phenothioxin, and 80 parts of diatomaceous earth were ground together in a ball mill to form a concentrate containing 20 per cent by weight of toxicant mixture. 0.25 pound of sodium lauryl sulfate and 2.5 pounds of the concentrate were dispersed in 100 gallons of water to obtain a spray mixture comprising 0.5 pound of the mixed toxicant. This spray composition was applied to bean foliage for the control of red spider and found to give a kill of 83.4 per cent without causing injury to the leaves of the host plant. In control determinations an aqueous dispersion of 0.25 pound of di-(4-chloro-phenoxy)-methane per 100 gallons gave a kill against red spider of 30.5 per cent, and one comprising 0.25 pound of phenothioxin per 100 gallons gave a kill of 37 per cent.

EXAMPLE 2

In a similar manner di-(4-chloro-phenoxy)-methane was compounded with monochloro-phenothioxin and the resulting concentrate dispersed in water to form a spray which was applied for the control of red spiders. A spray composition comprising 0.5 pound of the mixed toxicant per 100 gallons gave an average kill of 98 per cent. A composition comprising 0.25 pound of monochloro-phenothioxin per 100 gallons gave a kill against red spider of 49 per cent.

EXAMPLE 3

In a series of determinations di-(4-chloro-phenoxy) methane was tested against the larva of Mexican bean beetle, both alone and in combination with a number of phenothioxin compounds. The phenothioxin compounds alone were also tested to determine their effectiveness as toxicants. The procedure followed comprised dissolving the toxicant or toxicant mixture in an organic solvent such as benzene, acetone, or ether, wetting 80 parts by weight of diatomaceous earth with sufficient of the solution to contain 20 parts of toxicant, and thereafter mixing and warming the diatomaceous earth to drive off the solvent. The resulting dust concentrate was then dispersed in water containing 0.25 pound of sodium lauryl sulfate per 100 gallons as a wetting and dispersing agent. The resulting spray compositions were then applied to bean foliage infested with the test organism. Representative of the results obtained are the data set forth in the following table.

Table

| Pounds di-(4-chloro-phenoxy)-methane per 100 gallons | Supplementary toxicant | Pounds supplementary toxicant per 100 gallons | Per cent control |
| --- | --- | --- | --- |
| 0.5 | None | None | 40 |
| None | Phenothioxin | 0.5 | 0 |
| 0.5 | Phenothioxin | 0.5 | 100 |
| None | Monochloro-phenothioxin | 0.5 | 0 |
| 0.5 | Monochloro-phenothioxin | 0.5 | 100 |
| None | Phenothioxin-10-dioxide | 0.5 | 0 |
| 0.5 | Phenothioxin-10-dioxide | 0.5 | 95 |
| None | Phenothioxin-10-oxide | 0.5 | 0 |
| 0.5 | Phenothioxin-10-oxide | 0.5 | 95 |
| None | Mono-dodecyl-phenothioxin | 0.5 | 3 |
| 0.5 | Mono-dodecyl-phenothioxin | 0.5 | 90 |
| None | 1-phenyl-phenothioxin-10-dioxide | 0.5 | 0 |
| 0.5 | 1-phenyl-phenothioxin-10-dioxide | 0.5 | 80 |
| None | 3-chloro-phenothioxin-10-dioxide | 0.5 | 0 |
| 0.5 | 3-chloro-phenothioxin-10-dioxide | 0.5 | 60 |
| None | Mono-cyclohexyl-phenothioxin | 0.5 | 0 |
| 0.5 | Mono-cyclohexyl-phenothioxin | 0.5 | 60 |
| None | 1-phenyl-phenothioxin | 0.5 | 0 |
| 0.5 | 1-phenyl-phenothioxin | 0.5 | 95 |

EXAMPLE 4

Other mixtures which may be similarly employed for the control of insect and mite pests include the following:

Mixture A

| | Parts by weight |
| --- | --- |
| Di-(4-chloro-phenoxy)-methane | 1.5 |
| Phenothioxin | 3 |
| Volcanic ash | 95.5 |

Mixture B

| | Parts by weight |
| --- | --- |
| Di-(4-chloro-phenoxy)-methane | 2 |
| Mono-cyclohexyl-phenothioxin | 1 |
| Rotenone | 0.001 |
| Petroleum distillate | 100 |

Mixture C

| | | |
| --- | --- | --- |
| Di-(4-chloro-phenoxy)-methane | pound | 0.25 |
| Mono-chloro-phenothioxin | do | 0.5 |
| Water | gallons | 100 |

Mixture D

| | | |
| --- | --- | --- |
| Di-(4-chloro-phenoxy)-methane | pound | 0.25 |
| Mono-chloro-phenothioxin | do | 0.75 |
| Water | gallons | 100 |

Mixture E

| | | |
| --- | --- | --- |
| Di-(4-chloro-phenoxy)-methane | pound | 0.125 |
| Mono-chloro-phenothioxin | do | 0.75 |
| Water | gallons | 100 |
| Sodium lauryl sulfate | pound | 0.25 |

The compositions as set forth above may be employed as dusts or sprays for the control of such representative insect and mite pests as red spider, Mexican bean beetle, thrips, scale organisms, aphis, tent caterpillar, etc. Mixture B is specifically designed for the control of household insects such as flies, mosquitoes, roaches, and the like.

Other phenothioxin compounds which may be employed in combination with di-(4-chloro-phenoxy)-methane include mono-(4-methyl-phenyl)-phenothioxin, mono-2-xenyl-phenothioxin, 3-n-hexyl-phenothioxin, 2-bromo-phenothioxin, 1.3-dichloro-phenothioxin, 3-tertiarybutyl-phenothioxin, 3-nitrophenothioxin, 3-benzyl-phenothioxin, mixed polyethyl-phenothioxin, 1-cyclohexyl-phenothioxin-10-oxide, 3-cyclohexyl-phenothioxin-10-dioxide, 3-tertiaryoctyl-phenothioxin-10-oxide, mixed polyethyl-phenothioxin-10-dioxide, etc.

We claim:

1. An insecticidal composition comprising di-(4-chloro-phenoxy)-methane and a phenothioxin compound as active toxicants.

2. An insecticidal composition comprising as active toxicants di-(4-chloro-phenoxy)-methane and a phenothioxin compound having the formula

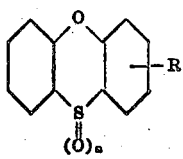

wherein R is selected from the group consisting of hydrogen, aryl of the benzene series, cycloalkyl, alkyl containing at least 6 carbon atoms, and halogen; and $n$ represents one of the values 0, 1, and 2.

3. An insecticidal composition comprising di-(4-chloro-phenoxy)-methane and phenothioxin as active toxicants.

4. An insecticidal composition comprising di-(4-chloro-phenoxy)-methane and mono-chlorophenothioxin as active toxicants.

5. An insecticidal composition comprising as an active toxicant a mixture of 10 parts by weight of di-(4-chlorophenoxy)-methane with from 1 to 100 parts by weight of a phenothioxin compound.

CURTIS E. DIETER.
GEORGE E. LYNN.
BERNARD J. THIEGS.